No. 840,083. PATENTED JAN. 1, 1907.
W. F. MORRIS.
FROSTING OR ICING PAN.
APPLICATION FILED OCT. 23, 1906.
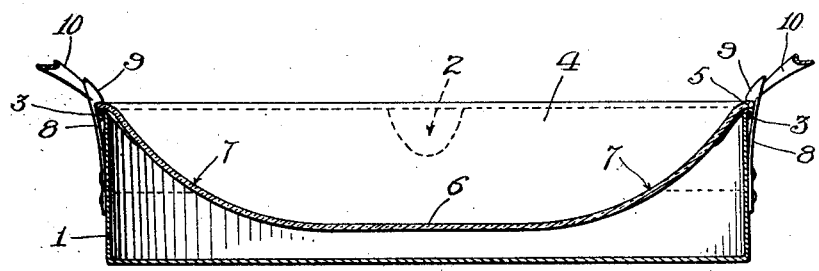
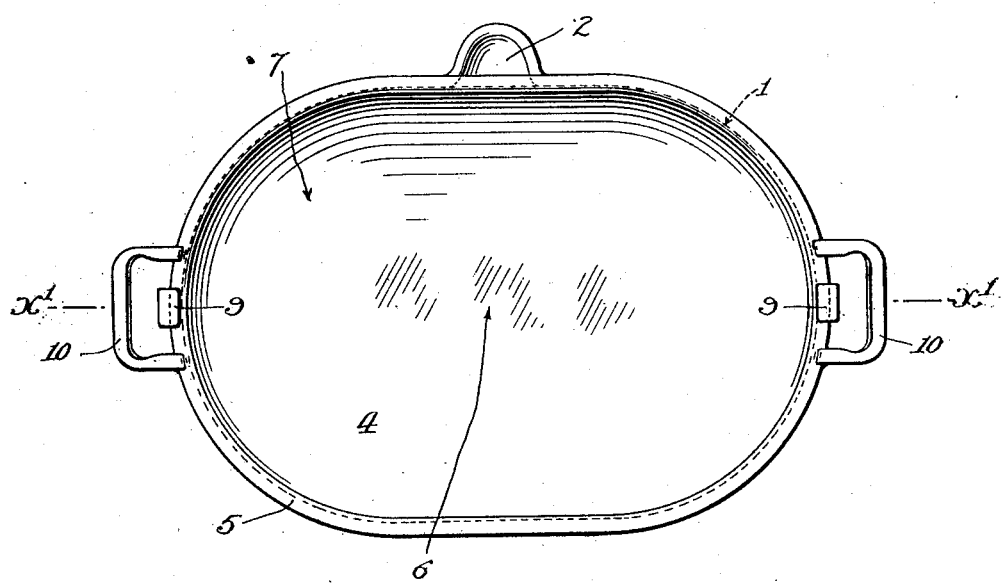
Witnesses:—
Frank L. A. Graham
Isabel Stall
Inventor:
William F. Morris.
by Townsend & Hackley & Knight
His Attys.

UNITED STATES PATENT OFFICE.

WILLIAM F. MORRIS, OF LOS ANGELES, CALIFORNIA, ASSIGNOR OF ONE-HALF TO A. J. ALLEN AND A. B. ALLEN, OF LOS ANGELES, CALIFORNIA.

FROSTING OR ICING PAN.

No. 840,083.     Specification of Letters Patent.     Patented Jan. 1, 1907.

Application filed October 23, 1906. Serial No. 340,226.

*To all whom it may concern:*

Be it known that I, WILLIAM F. MORRIS, a citizen of the United States, residing at Los Angeles, in the county of Los Angeles and State of California, have invented a new and useful Frosting or Icing Pan, of which the following is a specification.

This invention relates to a frosting or icing pan; and the main object of the invention is to provide a utensil with which frosting or icing may be prepared with greater facility and with better results than by the methods ordinarily employed.

Another object is to provide such a utensil which will enable the mixture to be beaten by one hand without requiring that the utensil be held stationary with the other hand.

Other objects and advantages will be brought out in the accompanying specification.

Referring to the drawings, Figure 1 is a vertical cross-section on line $xx$, Fig. 2. Fig. 2 is a plan view of the utensil.

The device comprises an outer pan 1, which is preferably oval in shape, as shown, and which may be constructed of any preferred material and may have a copper bottom or not, as desired. One side of the pan 1 is formed with a spout 2, as shown in Fig. 2, for the escape of steam from the pan, also enabling filling of the pan without lifting out the inner pan, hereinafter referred to. The upper edge of the pan 1 is preferably curled around a wire 3, as shown, which stiffens the pan and affords a seat for an inner pan 4, the latter being also oval in contour and having a flange 5, which rests upon the rim 3 of the pan 1. The bottom of the inner pan 4 has a flat central portion 6, which enables the pan to rest upon the table when removed from the pan 1 and prevents the pan 4 from tipping over. The bottom of the pan 4 lies somewhat above the bottom of the pan 1 and has concave walls 7, which are formed with easy curves, to which the flat bottom 6 is tangent. The concave shape of the inner pan, together with its oval form, enables the mixture to be readily beaten with a spoon or other implement used for the purpose. As there are no sharp corners or recesses, the pan having an entirely smooth surface, the mixture is prevented from accumulating at any point and in the act of beating the spoon readily reaches all of the mixture.

Riveted or otherwise secured to each end of the outer pan 1 are spring-catches 8 with heads 9, which project between handles 10 on each end of the inner pan, and the catches clasp over the flange 5 of the inner pan and hold the same firmly in position on the outer pan. The utensil may readily be carried by means of the handles when the inner pan is locked in place, and when the inner pan is lifted by the handles the outer pan 1 is lifted with it. To remove the inner pan, the heads 9 of the catches 8 may be simultaneously pressed out by the thumbs and the handles 10 grasped and lifted as soon as the heads 9 disengage the flange 5, and the inner pan 4 may thus be easily lifted out of the pan 1 and placed upon the table, its flat bottom 6 preventing it from tipping.

In use while the mixture is within the inner pan the outer pan is filled with water about to the level indicated by dotted lines, and whatever steam is formed is allowed to escape by the spout 2, and the utensil should be turned so that the spout 2 is on the side opposite from the cook. The catches 8 also hold the inner pan from jumping caused by the ebullition of the water.

In preparing a boiled icing, for example, the inner pan 4 is removed from the outer pan and the outer pan is partially filled with water and set on the stove. The eggs may be beaten up in the inner pan, which is removed and on the table. In the meantime water is heating in the outer pan, which is on the stove. Syrup, which has been prepared in another pan, is then poured into the inner pan, the eggs therein being beaten while the syrup is poured in. The inner pan, with its beaten mixture, is then placed in position in the outer pan, the water rising about to line indicated. The mixture is then beaten until it becomes smooth and stiff. The water, which during this time is boiling under the inner pan, cooks the mixture while it is being beaten, and the simultaneous cooking and beating produces in a few minutes an icing having a smooth grain and with the desired stiffness and consistency, enabling it to be readily spread on the cake as a coating or to be formed into various designs, enabling the production of artistic decorations. After cooking, the inner pan is lifted out and contents beaten until cool, the mixture being spread while cool.

The icing thus prepared does not set quickly, as does icing prepared in the ordinary manner, but maintains its plastic consistency for a considerable time, during which it can be spread on a layer or laid in any design, and yet its stiffness holds the shape of the design.

What I claim is—

A frosting or icing pan comprising an oval outer receptacle, an oval inner receptacle with a concave bottom, the central portion of which is flat, the inner receptacle nesting with the outer one, spring-catches on the ends of the outer receptacle detachably engaging the rim of the inner receptacle, the outer receptacle having a spout at one side, and handles on the inner receptacle protecting the spring-catches.

In testimony whereof I have hereunto set my hand, at Los Angeles, California, this 12th day of October, 1906.

WILLIAM F. MORRIS.

In presence of—
GEORGE T. HACKLEY,
FRANK L. A. GRAHAM.